United States Patent
Shimizu (10) Patent No.: US 8,788,204 B2
(45) Date of Patent: Jul. 22, 2014

(54) INFORMATION COMMUNICATION SYSTEM, DATA PROVIDING DEVICE AND IN-VEHICLE DEVICE

(71) Applicant: Denso Corporation, Kariya (JP)

(72) Inventor: Kouji Shimizu, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/688,655

(22) Filed: Nov. 29, 2012

(65) Prior Publication Data

US 2013/0158872 A1  Jun. 20, 2013

(30) Foreign Application Priority Data

Dec. 15, 2011 (JP) .................... 2011-274397

(51) Int. Cl.
    *G01C 21/00* (2006.01)
(52) U.S. Cl.
    USPC ............................................ 701/533
(58) Field of Classification Search
    None
    See application file for complete search history.

(56) References Cited

U.S. PATENT DOCUMENTS

2006/0106534 A1* 5/2006 Kawamata et al. .......... 701/208
2008/0201070 A1* 8/2008 Kikuchi ..................... 701/209

FOREIGN PATENT DOCUMENTS

JP  2004-354212  12/2004

* cited by examiner

*Primary Examiner* — Thomas Tarcza
*Assistant Examiner* — Adam Alharbi
(74) *Attorney, Agent, or Firm* — Harness, Dickey & Pierce, PLC (57) ABSTRACT

An information communication system includes: an in-vehicle device for displaying a region information map, which includes a branch point, regions ahead of the branch point, and routes connecting to each region; and a data providing device for supplying a region information map display data to the in-vehicle device. The data providing device includes: a data retrieving device for retrieving the region information map display data from a data storage device; a recommended route drawing data generation device for providing a recommended route; a drawing execution element display data generation device for providing a drawing execution element; and a data transmission device. The in-vehicle device includes: a display for displaying the region information map and the drawing execution element; and a recommended route drawing device for drawing the recommended route when a user operates the drawing execution element.

4 Claims, 9 Drawing Sheets

| | BRANCH P POS | | DAT OBT POS | | BRANCH P ORI DIR | DISP LIMIT P WITH BUT | | DISP LIMIT P WITHOUT BUT | | RE GUIDE END P | | DAT FOR DIS RE INF MAP |
|---|---|---|---|---|---|---|---|---|---|---|---|---|
| | LAT | LON | LAT | LON | | LAT | LON | LAT | LON | LAT | LON | |
| BRANCH P A | aaa | bbb | ccc | ddd | e | fff | ggg | hhh | iii | jjj | kkk | *** |
| BRANCH P B | ⋮ | ⋮ | ⋮ | ⋮ | ⋮ | ⋮ | ⋮ | ⋮ | ⋮ | ⋮ | ⋮ | ⋮ |
| BRANCH P C | ⋮ | ⋮ | ⋮ | ⋮ | ⋮ | ⋮ | ⋮ | ⋮ | ⋮ | ⋮ | ⋮ | ⋮ |
| .... | .... | .... | .... | .... | .... | .... | .... | .... | .... | .... | .... | .... |

# INFORMATION COMMUNICATION SYSTEM, DATA PROVIDING DEVICE AND IN-VEHICLE DEVICE

CROSS REFERENCE TO RELATED APPLICATION

This application is based on Japanese Patent Application No. 2011-274397 filed on Dec. 15, 2011, the disclosure of which is incorporated herein by reference.

TECHNICAL FIELD

The present disclosure relates to an information communication system, a data providing device and an in-vehicle device. The in-vehicle device displays a region information map, which includes multiple regions disposed ahead of a branch point and multiple routes connected to the regions, respectively. The data providing device provides data for displaying the region information map to the in-vehicle device. The data providing device and the in-vehicle device provide the information communication system.

BACKGROUND

An information communication system for providing a region information map, which is displayed before a branch point, is disclosed in JP-A-2004-354212. The system determines whether a traffic jam area and/or a dense traffic area exits in the region information map. When there is no traffic jam area and no dense traffic area in the region information map, the system does not display the region information map.

Since the system displays the region information map when the traffic jam area and/or the dense traffic area exist in the region information map, an user can recognize, the existence of the traffic jam area and/or the dense traffic area according to the displayed region information map. However, the user has to determine by himself or herself how to bypass the traffic jam area and/or the dense traffic area. Thus, the user may hesitate to determine a bypassing method.

SUMMARY

It is an object of the present disclosure to provide an information communication system, a data providing device and an in-vehicle device. The data providing device and the in-vehicle device provide the information communication system, which displays a route recommended to the user on a region information map.

According to an example aspect of the present disclosure, an information communication system includes: an in-vehicle device for displaying a region information map, which includes a branch point, one or a plurality of regions disposed ahead of the branch point, and one or a plurality of routes connecting to each region; and a data providing device having a data storage device for storing region information map display data that provides to display the region information map. The data providing device supplies the region information map display data to the in-vehicle device. The data providing device further includes: a data retrieving device for retrieving the region information map display data from the data storage device; a recommended route drawing data generation device for specifying a recommended route among the plurality of routes, each of which connects to one of the regions in the region information map, and for generating recommended route drawing data that provides to display the recommended route, the region information map being to be displayed according to the region information map display data; a drawing execution element display data generation device for generating drawing execution element display data that provides to display a drawing execution element, which executes to draw the recommended route; and a data transmission device for transmitting the region information map display data, the recommended route drawing data, and the drawing execution element display data to the in-vehicle device. The in-vehicle device includes: a display for displaying the region information map based on the region information map display data received from the data transmission device, and for displaying the drawing execution element based on the drawing execution element display data; and a recommended route drawing device for drawing the recommended route together with the region information map according to the recommended route drawing data when a user operates the drawing execution element.

In the above system, the drawing execution element for displaying the recommended route is displayed on the region information map, which is displayed before the branch point. Accordingly, when the user operates the drawing execution element, the system can display the recommended route. Thus, the user does not hesitate to determine a route.

According to another aspect of the present disclosure, a data providing device for supplying region information map display data to an in-vehicle device, wherein the region information map display data provides to display a region information map, which includes a branch point, one or a plurality of regions disposed ahead of the branch point, and one or a plurality of routes connecting to each region, the data providing device includes: a data storage device for storing the region information map display data; a data retrieving device for retrieving the region information map display data from the data storage device; a recommended route drawing data generation device for specifying a recommended route among the plurality of routes, each of which connects to one of the regions in the region information map, and for generating recommended route drawing data that provides to display the recommended route, the region information map being to be displayed according to the region information map display data; a drawing execution element display data generation device for generating drawing execution element display data that provides to display a drawing execution element, which executes to draw the recommended route; and a data transmission device for transmitting the region information map display data, the recommended route drawing data, and the drawing execution element display data to the in-vehicle device.

In the above apparatus, when the user operates the drawing execution element, the in-vehicle device can display the recommended route. Thus, the user does not hesitate to determine a route.

According to further another aspect of the present disclosure, an in-vehicle device for displaying a region information map, which includes a branch point, one or a plurality of regions disposed ahead of the branch point in a driving direction, and one or a plurality of routes connecting to each region, according to a region information map display data provided from a data providing device, the in-vehicle device includes: a display for displaying the region information map based on the region information map display data received from the data providing device, and for displaying a drawing execution element based on a drawing execution element display data received from the data providing device; and a recommended route drawing device for drawing a recommended route together with the region information map according to a recommended route drawing data when a user operates the drawing execution element.

In the above apparatus, when the user operates the drawing execution element, the in-vehicle device can display the recommended route. Thus, the user does not hesitate to determine a route.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
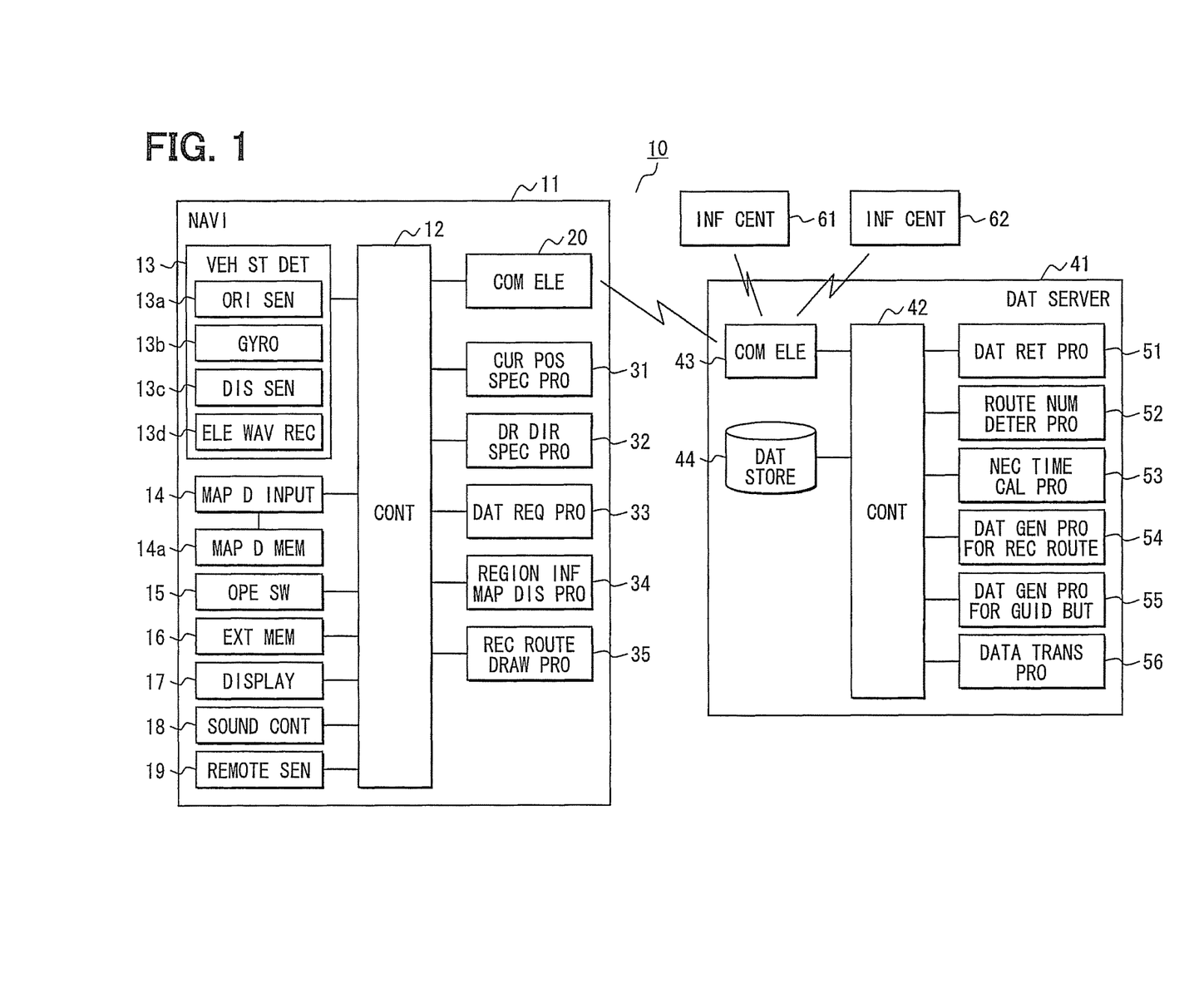
FIG. 1 is a block diagram showing a navigation system according to an example embodiment.
Figure 2:
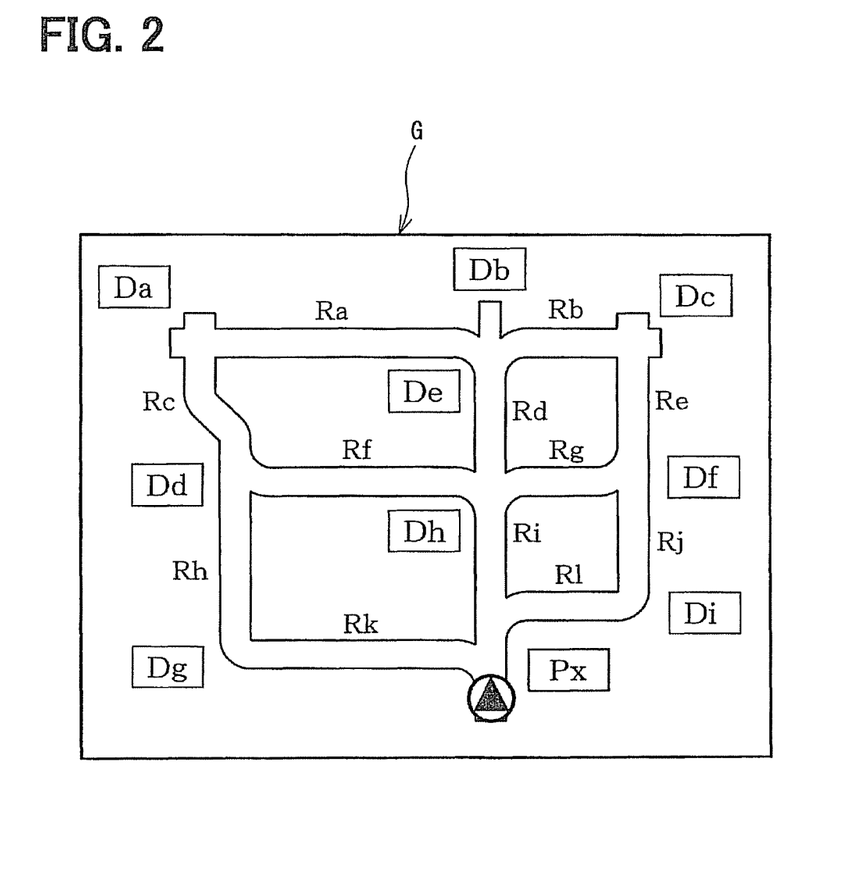
FIG. 2 is a diagram showing an example of a region information map in a case where a guidance button is not displayed.

An example embodiment of the present disclosure will be explained with reference to the drawings. As shown in FIG. 1, a navigation system 10 includes a navigation apparatus 11 and a data providing server 41, which are communicable with each other. The system 10 corresponds to an information communication system.

The navigation apparatus 11 corresponds to an in-vehicle device. The apparatus 11 is mounted on a vehicle such as an automobile, and includes a controller 12, a vehicle state detector 13, a map data input element 14, an operation switch 15, an external memory 16, a display 17, a sound controller 18, a remote control sensor 19, a communication element 20 and the like. The controller 12 includes a micro computer having a CPU, a ROM and a RAM. The controller 12 controls all of operations of the navigation apparatus 11. Further, when the controller 12 executes a control program with the CPU, the controller 12 provides a current position specifying processor 31, a driving direction specifying processor 32, a data requesting processor 33, a region information map processor 34, and a recommendation route drawing processor 35, which are virtually realized by software. Here, the data requesting processor 33 corresponds to a data request device, the region information map processor 34 corresponds to a display, and the recommendation route drawing processor 35 corresponds to a recommendation route drawing device.

The vehicle state detector 13 is a detecting module for detecting various vehicle states such as a current position and a driving direction of a vehicle, on which the navigation apparatus 11 is mounted. The vehicle state detector 13 includes an orientation sensor 13a, a gyro sensor 13b, a distance sensor 13c, an electric wave receiver 13d for a positioning system and the like. The orientation sensor 13a detects an orientation of the vehicle. The gyro sensor 13b detects a rotation angle of the vehicle. The distance sensor 13c detects a driving distance of the vehicle. The electric wave receiver 13d receives an electric wave transmitted from an artificial satellite for the positioning system (not shown) in order to measure the current position of the vehicle. The vehicle state detector 13 detects various vehicle states (i.e., vehicle conditions) such as the current position and the driving direction with complementing various detection data obtained from various above-described sensors.

The map data input element 14 obtains the map data from the map data memory 14a. The map data stored in the memory 14a is read out by a drive device (not shown) so that the map data input element 14 reads out the data. The memory 14a is, for example, a large capacity memory medium such as a DVD and a CD or a memory medium such as a memory card and a hard disk drive. The map data in the memory 14 is preliminary provided by an information providing source such as an external memory medium or a data providing server 41. The external memory medium is, for example, a DVD, a hard disk drive or the like. The map data includes road data, landmark data, map matching data, destination data, table data for converting traffic information to the road data and the like. The road data includes multiple nodes and multiple links, each of which connects the nodes.

The operation switch 15 includes a mechanical switch arranged near the screen of the display 17, and a touch panel switch arranged on the screen of the display 17. The user inputs various commands with using each switch element of the operation switch 15. The commands are for example, a command for setting the destination of the route guidance and a command for switching the screen and/or the display mode of the display 17. Specifically, the command for switching the screen and the display mode includes a command for changing a scale of the map, a command for selecting the menu screen, a command for searching the route, a command for starting the route guidance, a command for correcting the current position and a command for adjusting a volume. Thus, the navigation apparatus 11 functions according to the instructions of the user. The remote control sensor 19 transmits to and receives a command from a remote controller (not shown). The remote controller includes multiple operation switches. When the user operates an operation switch of the remote controller, various instruction signals are input into the controller 12 via the remote control sensor 19.

The external memory 16 includes a memory medium such as a detachable flash memory card and a hard disk drive. The external memory 16 may be commonly used as a RAM and a EEPROM arranged in the controller 12 of the navigation apparatus 11 or the map data memory 14a. The display 17 includes a color display such as a liquid crystal display and an organic EL display. The map around the current position of the vehicle is displayed on the screen of the display 17 with various scales. Further, the current position mark showing the current position and the driving direction of the vehicle is displayed and overlapped on the map. Further, when the apparatus 11 performs the route guidance to the destination, the image for the route guidance is displayed on the screen of the display 17. The display 17 displays various operation buttons as a touch button.

The sound controller 18 is connected to a speaker (not shown). The sound controller 18 controls the speaker to output sound according to the sound output signal input from the controller 12. The sound output from the speaker includes a voice message for the route guidance, a voice message relating to the operation explanation, a voice message for notifying the operation of the antitheft function, a voice message of a talk back function relating to a result of a voice recognition process and the like. The communication element 20 performs data communication to the data providing server 41 via a wireless communication line, for example.

The controller 12 of the navigation apparatus 11 controls the display 17 to display the road map around the current position on the screen and display the current position mark showing the current position and the driving direction of the vehicle, which is overlapped on the road map, so that the vehicle can runs along the driving route. In this case, the mark moves on the map when the vehicle runs. The display 17 scrolls the map displayed in the display 17 according to the current position of the vehicle. In this case, the controller 12 performs the map matching process for matching the current position to the road.

The current position specifying processor 31 executes the current position specifying process according to the instruction signal from the controller 12. In the current position specifying process, the current position of the vehicle, on which the navigation apparatus 11 is mounted, is specified based on the detection data input from the vehicle state detector 13.

The driving direction specifying processor 32 executes the driving direction specifying process according to the instruction signal from the controller 12. In the driving direction specifying process, the driving direction of the vehicle, on which the navigation apparatus 11 is mounted, is specified based on the detection data input from the vehicle state detector 13.

The data requesting processor 33 executes the data requesting process according to the instruction signal from the controller 12. In the data requesting process, when the current position specified by the current position specifying processor 31 coincides with the preliminary set data obtaining point, and the driving direction of the vehicle specified by the driving direction specifying processor 32 coincides with the preliminary set branch point orientation direction, the request signal is transmitted to the data providing server 41. Here, the navigation apparatus 11 preliminary obtains the data obtaining point data for specifying the data obtaining point and the branch point orientation direction data for specifying the branch point orientation direction from the data providing server 41. The data obtaining point data and the branch point orientation direction data will be explained later. The request signal is a signal for requesting the data providing server 41 to provide various data such as the region information map display data. The controller 12 transmits the request signal together with at least the current position data for showing the current position of the vehicle to the data providing server 41.

The region information map processor 34 executes the region information map displaying process according to the instruction signal from the controller 12. The region information map displaying process includes: a process for displaying, for example, the region information map G shown in FIG. 2 on the display 17 according to the region information map display data received from the data providing server 41 before the branch point disposed on ahead of the vehicle in the driving direction; and a process for displaying, for example, a guide button Ba shown in FIG. 3A or a guide button Bb shown in FIG. 4A according to the guide button display data when the apparatus 11 receives the recommended route drawing data and the guide button display data from the data providing server 41. As shown in FIGS. 2 to 4B, the region information map G includes the name of the branch point Px disposed on ahead of the vehicle in the driving direction, the names of multiple regions Da to Di disposed on ahead of the branch point Px, and the names of routes from the branch point Px to the regions Da to Di.

Figure 3A:
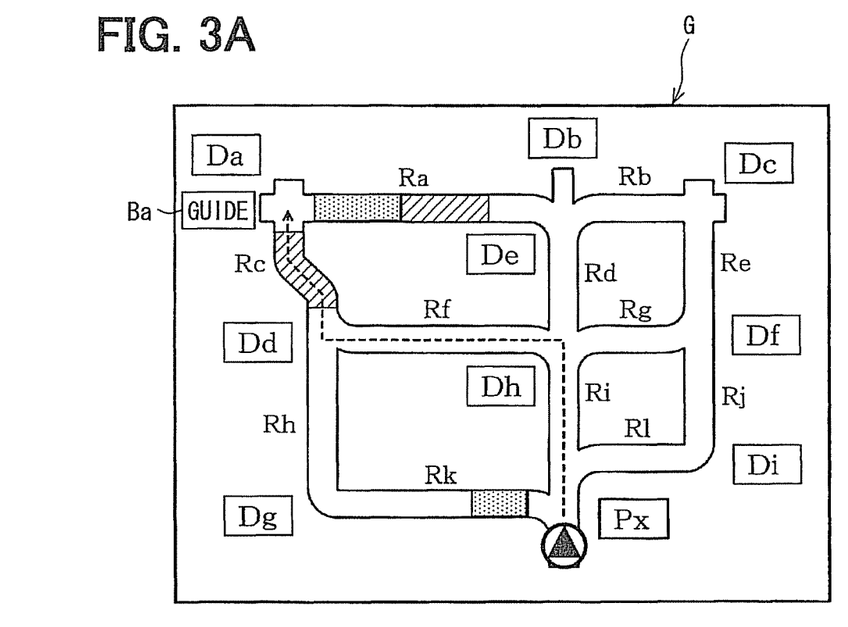
FIG. 3A is a diagram showing an example of a region information map in a case where a guidance button is displayed before a recommended route is not drawn.
Figure 3B:
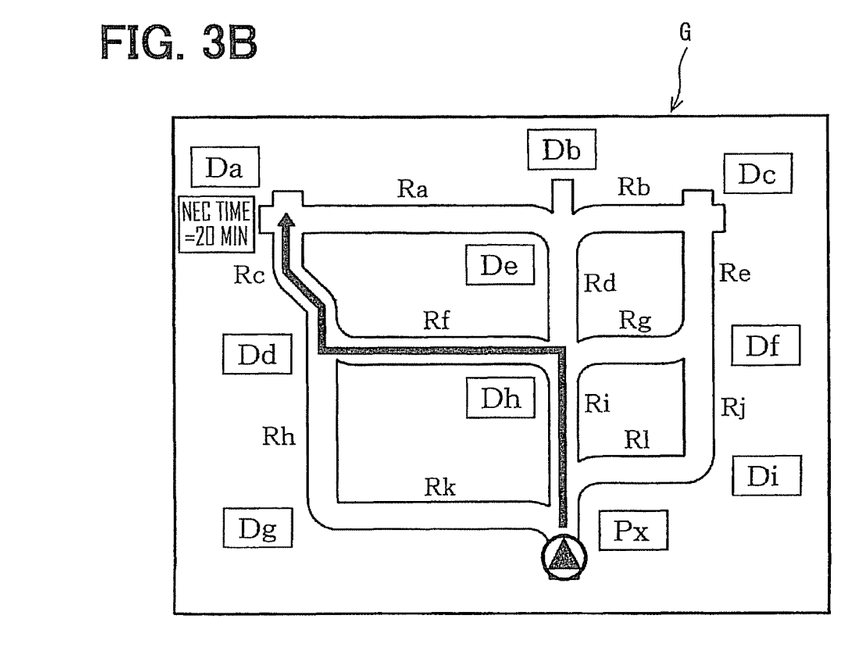
FIG. 3B is a diagram showing an example of a region information map in a case where a guidance button is displayed after a recommended route is not drawn.
Figure 4A:
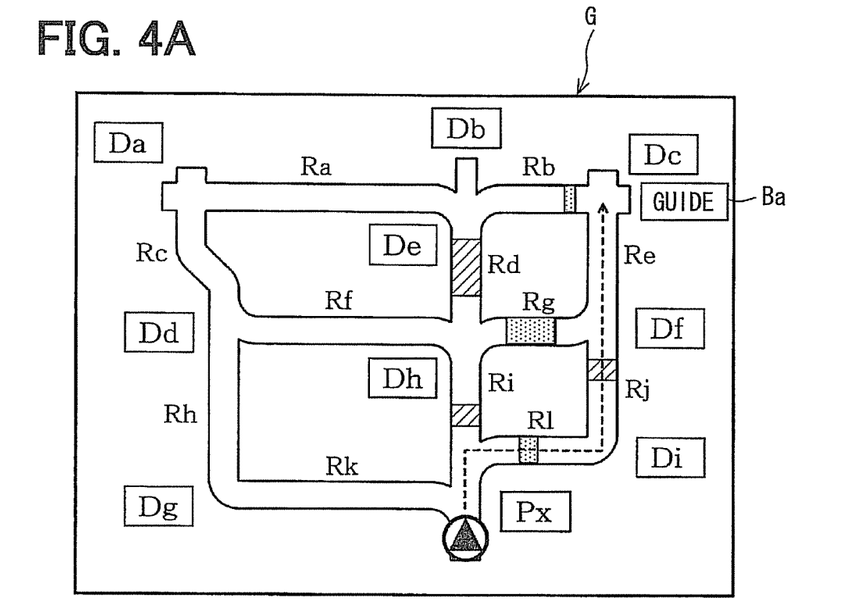
FIG. 4A is a diagram showing another example of a region information map in a case where a guidance button is displayed before a recommended route is not drawn.
Figure 4B:
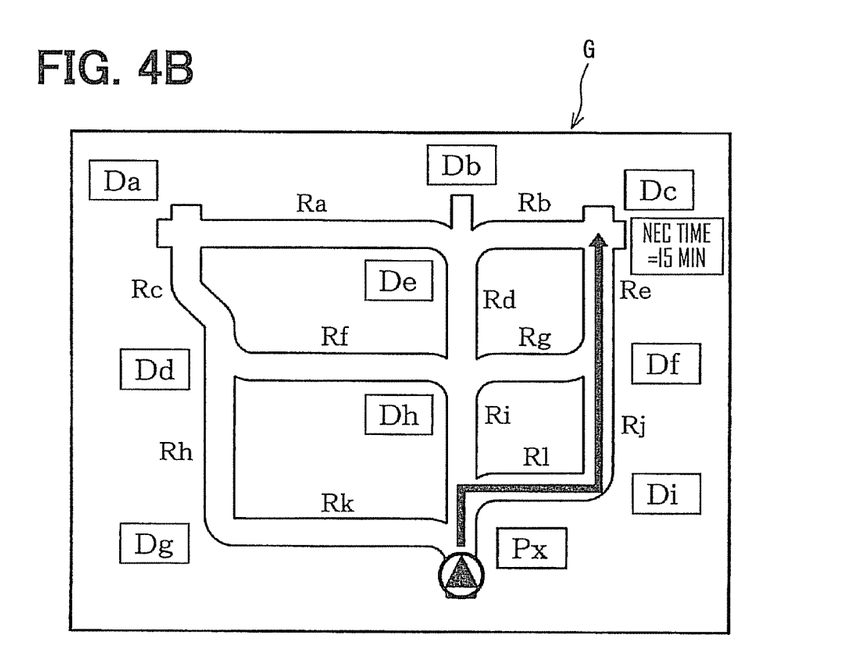
FIG. 4B is a diagram showing another example of a region information map in a case where a guidance button is displayed after a recommended route is not drawn.

The recommendation route drawing processor 35 executes the recommended route drawing process according to the instruction signal from the controller 12. In the recommended route drawing process, when the guide button on the display 17 is operated, for example, as shown in FIG. 3B or 4B, the processor 35 generates the recommended route R according to the recommended route drawing data received from the data providing server 41. Further, the processor 35 draws the recommended route, which is overlapped on the region information map on the display 17. Specifically, for example, when the user operates the guide button Ba shown in FIG. 3A, as shown in FIG. 3B, the recommended route R[i-f-c] directing to the region Da is overlapped and displayed on the region information map G. The recommended route R[i-f-c] is overlapped on corresponding routes Ri, Rf, Rc of the region information map G. Further, when the user operates the guide button Bb shown in FIG. 4A, as shown in FIG. 4B, the recommended route R[l-j-e] directing to the region Dc is overlapped and displayed on the region information map G. The recommended route R[l-j-e] is overlapped on corresponding routes Rl, Rj, Re. The recommended route R[i-f-c] includes the routes Rl, Rf, Rc. The recommended route R[l-j-e] includes the routes Rl, Rj, Re.

Next, the constitution of the data providing server 41 will be explained. The server 41 corresponds to the data providing device. The server 41 includes the controller 42, the communication element 43 and the data storage element 44. The controller 42 includes a micro computer having a CPU, a ROM and a RAM. The controller 42 controls a whole of operations in the data providing server 41. The controller 42 executes the control program in the CPU. Thus, the controller 42 virtually realize the data retrieving processor 51, the route number determination processor 52, the necessary time calculation processor 53, the data generation processor 54 for generating the recommended route drawing data, the data generation processor 55 for generating the guide button display data, and the data transmitting processor 56 by software. Here, the data retrieving processor 51 corresponds to the data retrieving device. The route number determination processor 52 corresponds to the route number specifying device. The necessary time calculation processor 53 corresponds to the necessary time calculation device. The data generation processor 54 for generating the recommended route drawing data corresponds to the recommended route drawing data generation device. The data generation processor 55 for generating the guide button display data corresponds to the drawing process executing element displaying data generation device. The data transmitting processor 56 corresponds to the data transmitting device.

The communication element 43 communicates with the navigation apparatus 11 in the vehicle via the wireless communication line, for example. Further, the communication element 43 communicates with multiple external information centers 61, 62 via the wireless communication line, for example. The element 43 obtains various information from the information centers 61, 62. The information centers 61, 62 are arranged in the regions, respectively. Each information center 61, 62 stores information regarding a corresponding region. The information stored in the center 61, 62 includes traffic information such as traffic jam information, traffic restriction information, construction work information, and traffic accident information with respect to the corresponding region.

Figure 5:
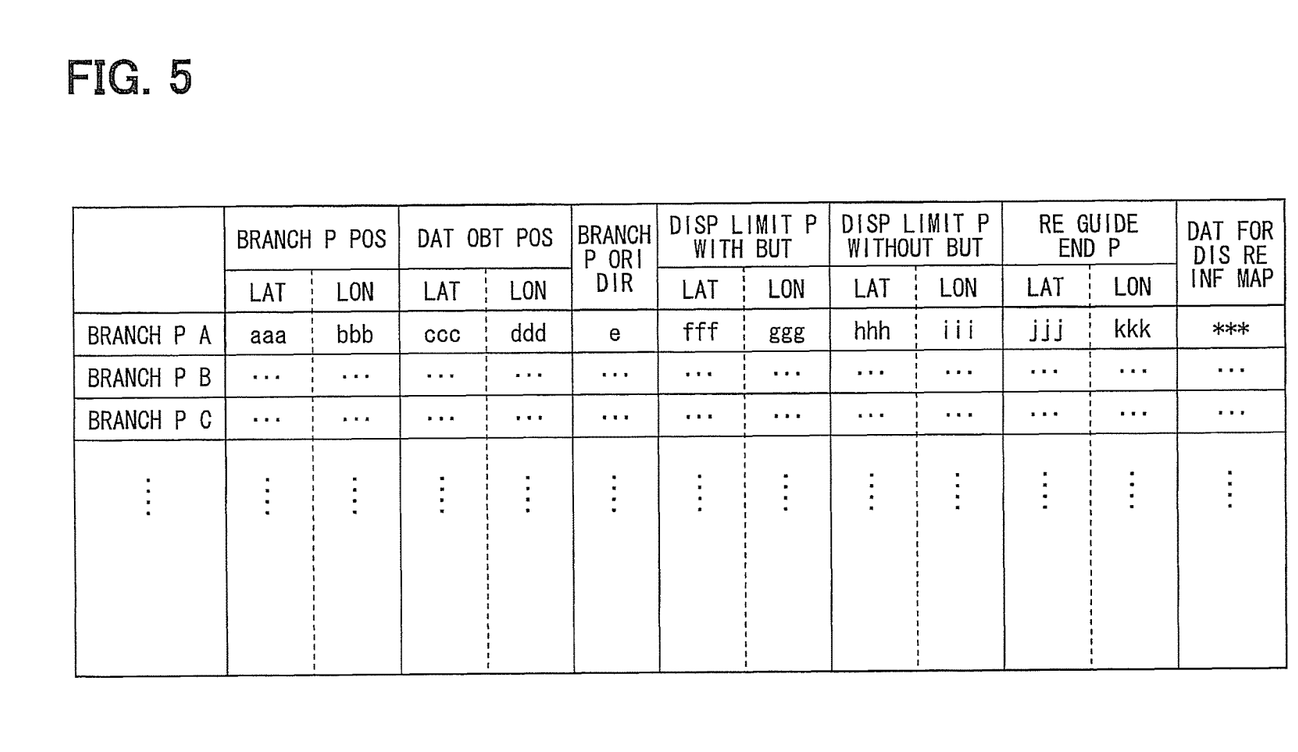
FIG. 5 is a diagram showing an example of data stored in a data storage element.

The data storage element 44 is the database corresponds to the data storage device. As shown in FIG. 5, the data storage element 44 stores the branch point position data, the data obtaining point data, the branch point orientation direction data, the display limit point data, the region guide end point data, and the region information map displaying data in connection with each branch point disposed on the road in the map.

The branch point position data is data for specifying the position of each branch point arranged on the road in the map. In this case, the branch point position data includes latitude data indicative of the latitude of the branch point and the longitude data indicative of the longitude of the branch point.

Figure 6:
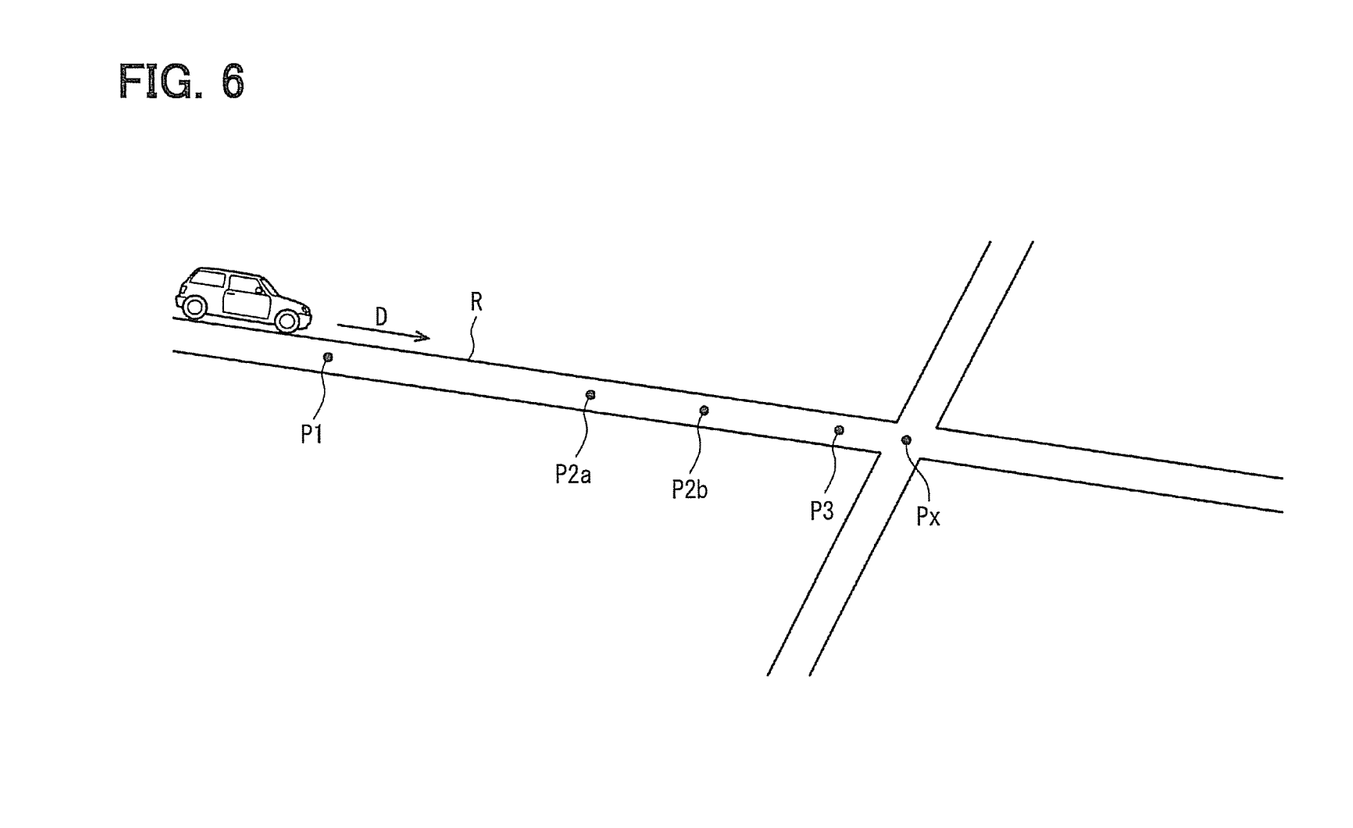
FIG. 6 is a diagram showing an example of a relationship among a data obtaining point, a branch point orientation direction, a display limit point, a region guide end point, and a branch point.

The data obtaining point data is data for specifying the data obtaining point, which is set in connection with each branch point on the road in the map. In this case, the data obtaining point data includes latitude data indicative of the latitude of the data obtaining point and the longitude data indicative of the longitude of the data obtaining point. As shown in FIG. 6, the data obtaining point P1 is set at a point spaced apart from the branch point Px by a predetermined distance. The data obtaining point P1 is disposed on the road R, on which the branch point Px is disposed. The predetermined distance may be changeable. As described above, the data obtaining point data is preliminary provided in the navigation apparatus 11 at the shipping time or the initial setting time.

The branch point orientation direction data is data for specifying the branch point orientation direction, which is set in connection with each branch point disposed on the road of the map. In this case, the branch point orientation direction data is set on the basis of the direction to the north as a standard direction so that the direction to the north on the map defines zero degree. As shown in FIG. 6, the branch point orientation direction D is defined as the direction toward the branch point Px from the data obtaining point P1, which is set in connection with the branch point Px. As described above, the branch point orientation direction data is preliminary provided in the navigation apparatus 11 at the shipping time or the initial setting time.

The display limit point data is data for specifying the display limit point, which is set in connection with each branch point on the road of the map. In this case, the display limit point includes the display limit point with a button and the display limit point without a button. Thus, the display limit point in case of displaying the guidance button is different from the display limit point in case of not displaying the guidance button. Specifically, when the guidance button is displayed, the distance between the display limit point and the branch point is, for example, 600 meters. When the guidance button is displayed, the distance between the display limit point and the branch point is, for example, 300 meters. Thus, the distance in a case where the guidance button is displayed is longer than the distance in a case where the guidance button is not displayed. The reason why the distance between the display limit point and the branch point when the guidance button is displayed is longer than the distance between the display limit point and the branch point when the guidance button is not displayed is to secure the time for the user to operate the guidance button and/or to secure the time for the user to confirm the recommended route, which is displayed according to the operation of the guidance button.

In the above case, the display limit point data includes latitude data for showing the latitude of the display limit point and the longitude data for showing the longitude of the display limit point. As shown in FIG. 6, the display limit points P2a, P2b are arranged on the road R, along which the branch point Px is disposed, and disposed between the branch point Px and the data obtaining point P1. The data obtaining point P1 is set in connection with the branch point Px. Specifically, the distance between the display limit point P2a and the branch point Px, and the distance between the display limit point P2b and the branch point Px are shorter than the distance between the data obtaining point P1 and the branch point Px. Here, the display limit point P2a represents the display limit point in a case where the guidance button is displayed. The display limit point P2b represents the display limit point in a case where the guidance button is not displayed. The display limit point data is not preliminary stored in the navigation apparatus 11, but the display limit point data is provided from the data providing server 41 to the navigation apparatus 11 when the data providing server 41 receives the request signal from the navigation apparatus 11.

The region guide end point data is data for specifying the region guide end point, which is set in connection with the branch point on the road. In this case, the region guide end point data includes latitude data for showing the latitude of the region guide end point and the longitude data for showing the longitude of the region guide end point. As shown in FIG. 6, the region guide end point P3 id disposed on the road R, along which the branch point Px is disposed. Further, the region guide end point P3 is arranged between the branch point Px and the display limit points P2a, P2b, which are set in connection with the branch point Px. Specifically, the distance between the region guide end point P3 and the branch point Px is shorter than the distance between the display limit point P2a and the branch point Px and the distance between the display limit point P2b and the branch point Px.

The region information map display data is data for generating the region information map, which shows a route from the branch point to multiple regions and the regions disposed ahead of the branch point, in a simple manner. In this case, the region information map display data includes information for specifying each region on the region information map, for example, information for specifying the name and the position of the region Da-Di in FIG. 2. Further, the data includes information for specifying the route to each region. For example, the data includes the information for specifying the name, the position and the distance of each route Ra-Rl shown in FIG. 2.

The data retrieving processor 51 executes the data retrieving process according to the instruction signal from the controller 42. In the data retrieving process, various data such as the region information map data to be provided to the navigation apparatus 11 is retrieved from the data storage element 44 when the request signal is transmitted from the navigation apparatus 11. Specifically, the data retrieving processor 51 specifies the current position of the vehicle, on which the navigation apparatus 11 is mounted, based on the current position data that is added to the request signal received from the navigation apparatus 11. The processor 51 retrieves various data, which is stored in connection with the data obtaining point corresponding to the current position, from the data storage element 44.

The route number determination processor 52 executes the route number determination process according to the instruction signal from the controller 42. In the route number determination process, the processor 52 specifies the number of routes connecting to each region from the branch point, each region being included in the region information map displayed based on the region information map display data, which is retrieved by the data retrieving processor 51.

The necessary time calculation processor 53 executes the necessary time calculation process according to the instruction signal from the controller 42. In the necessary time calculation process, the processor 53 calculates the necessary time for reaching from the branch point to a certain region when the vehicle runs along each route in a case where the number of routes specified by the route number determination processor 52 is higher than one.

The data generation processor 54 for generating the recommended route drawing data executes the data generation process for drawing the recommended route according to the instruction signal from the controller 42. In the data generation process for drawing the recommended route, the processor 54 specifies the route having the shortest necessary time calculated by the necessary time calculation processor 53 as the recommended route. Further, the processor 54 generates the data for drawing the recommended route to overlap on the region information map.

The data generation processor 55 for generating the guide button display data executes the data generation process for displaying the guide button according to the instruction signal from the controller 42. In the data generation process for displaying the guide button, the processor 55 generates the data for displaying the guide button when the data generation processor 54 generates the data for drawing the recommended route. Here, the data for displaying the guide button corresponds to the drawing process execution element displaying data. Further, the guide button corresponds to the drawing process execution element. The display 17 of the navigation apparatus 11 displays the guide button. In this case, the display 17 displays the button as a touch button. When the user operates the guide button of the navigation apparatus 11, the controller 12 of the navigation apparatus 11 executes to draw the recommended route according to the recommended route drawing data.

The data transmitting processor 56 executes the data transmitting process according to the instruction signal from the controller 42. In the data transmitting process, the processor 56 transmits the region information map displaying data retrieved by the data retrieving processor 51 to the navigation apparatus 11 via the communication element 43. When the data generation processor 54 generates the recommended route drawing data, the processor 56 transmits the recommended route drawing data and the guide button display data, which is generated according to the recommended route drawing data, to the navigation apparatus 11 via the communication element 43.

Next, the operation of the navigation system 10, i.e., the control process executed by the navigation apparatus 11 and the data providing server 41 will be explained as follows. Here, the control process is executed by the controller 12 of the navigation apparatus 11, and executed by the controller 42 of the data providing server 41.

Figure 7:
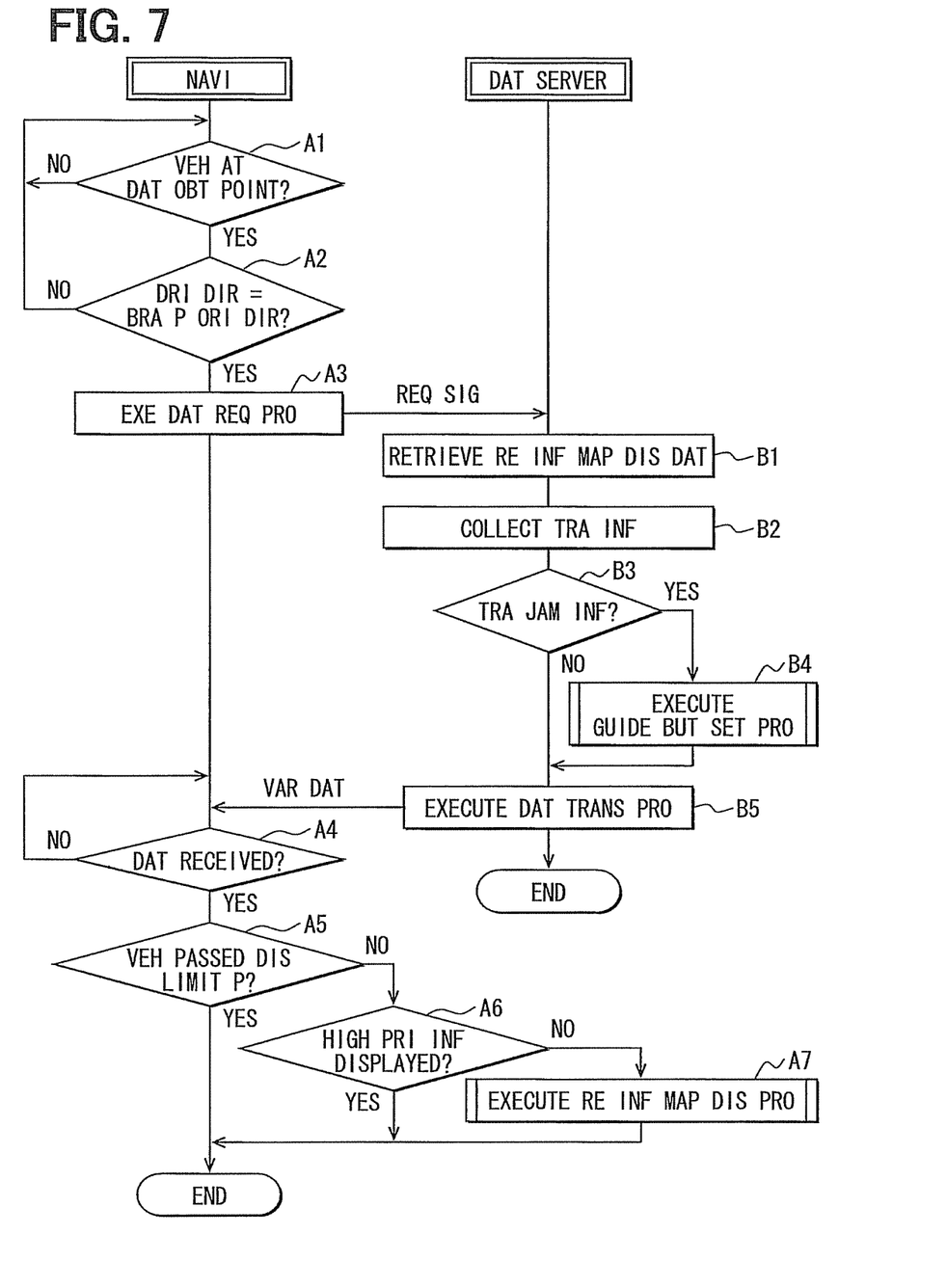
FIG. 7 is a flowchart showing an operation of the navigation system.

The navigation apparatus 11 obtains the data obtaining point data and the branch point orientation direction data, which are set in relation to each branch point disposed on the map, from the data providing server 41. As shown in FIG. 7, the navigation apparatus 11 monitors in step A1 whether the vehicle, on which the navigation apparatus 11 is mounted, reaches one of the data obtaining points, i.e., whether the current position of the vehicle coincides with one of the data obtaining points, which are specified by the data obtaining point data. When the vehicle arrives at one of the data obtaining points, i.e., when the determination in step A1 is "YES," the apparatus 11 determines in step A2 whether the vehicle travels toward the branch point, which corresponds to the data obtaining point, i.e., whether the driving direction Of the vehicle coincides with the branch point orientation direction corresponding to the data obtaining point. Here, the branch point orientation direction is a direction from the data obtaining point to the branch point corresponding to the data obtaining point.

When the driving direction of the vehicle does not coincide with the branch point orientation direction, i.e., when the determination in step A2 is "NO," it returns to step A1. When the driving direction of the vehicle coincides with the branch point orientation direction, i.e., when the determination in step A2 is "YES," it goes to step A3. In step A3, the apparatus 11 executes the data request process with the data requesting processor 33. In step A4, the apparatus 11 waits for the data from the data providing server 41 with monitoring whether the apparatus 11 receives the data from the server 41.

The data providing server 41 specifies the current position of the vehicle based on the current position data, which is attached to the received request signal, according to the data request signal from the apparatus 11. Specifically, the server 41 specifies the data obtaining point, at which the vehicle arrives. Then, in step B1, the server 41 retrieves the region information map display data, which is stored in relation to the data obtaining point corresponding to the current position, from the data storage element 44. Further, in step B2, the server 41 specifies one of branches, which is an object of displaying the region information map, as the guide object branch point, based on the branch point position data stored in relation to the data obtaining point corresponding to the specified current position of the vehicle. Further, the server 41 collects the traffic information around the specified guide object branch point. Here, the range around the specified guide object branch point, in which the traffic information is collected, is changeable.

Next, in step B3, the server 41 determines whether the collected traffic information includes the traffic jam information. When the server 41 determines that the collected traffic information does not include the traffic jam information, i.e., when the determination in step B3 is "NO," it goes to the data transmission process in step B5. When the server 41 determines that the collected traffic information includes the traffic jam information, i.e., when the determination in step B3 is "YES," it goes to the guide button setting process in step B4.

Figure 8:
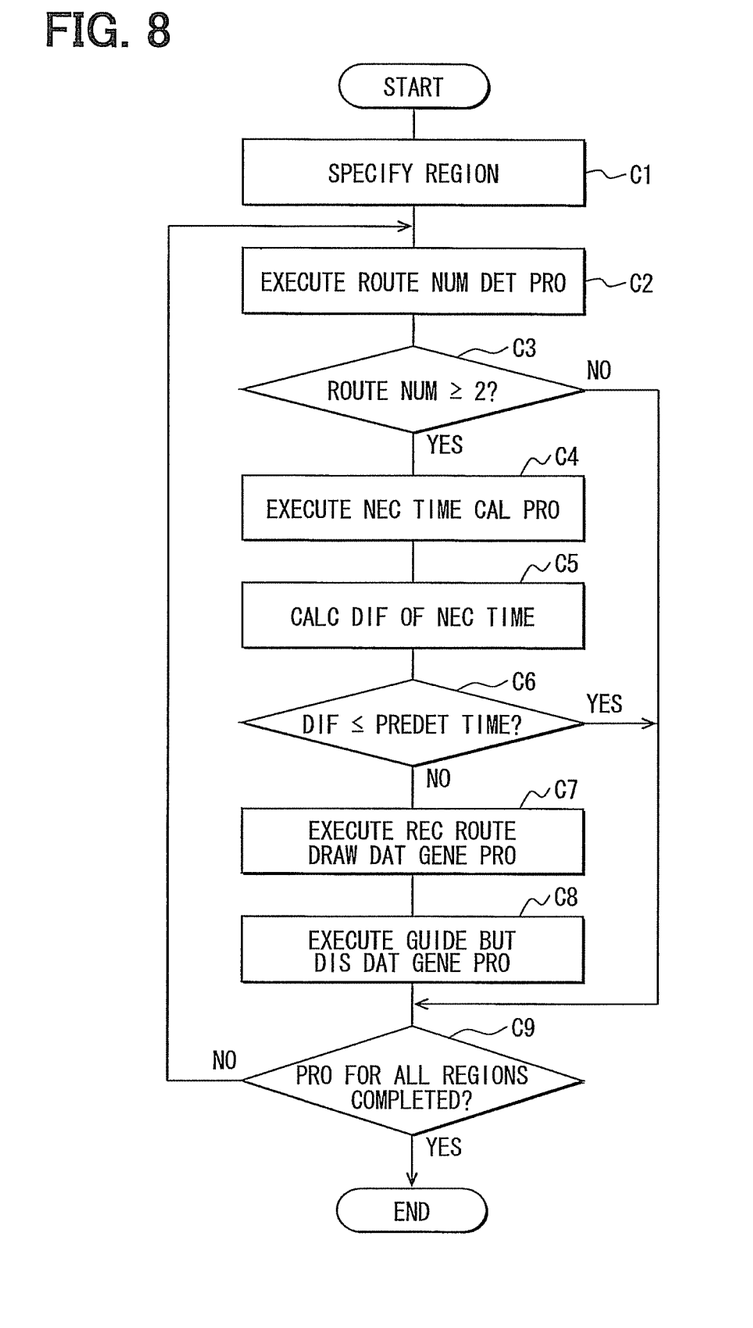
FIG. 8 is a flowchart showing a guide button setting process.

Here, the guide button setting process will be explained with reference to the flowchart in FIG. 8. In the guide button setting process, in step C1, the server 41 specifies one of regions in the region information map, which is displayed based on the region information map display data retrieved in step B1. The server 41 sequentially sets one of the regions in the region information map as a process object region. Further, the server 41 executes the following steps with respect to the specified one of the regions as the process object region. Specifically, the server 41 executes the route number determination process in step C2, which is processed by the route number determination processor 52. In the route number determination process, the server 41 specifies the number of routes, each of which connects between the guide object branch point and the process object region.

Then, the server 41 determines inn step C1 whether the number of routes for connecting between the guide object branch point and the process object region is equal to or larger than two. When the server 41 determines that the route number is less than two, i.e., when the server 41 determines that the route number is one (i.e., when the determination in step C3 is "NO"), it goes to step C9.

When the server 41 determines that the route number is equal to or larger than two, i.e., when the determination in step C3 is "YES", it goes to step C4. In step C4, the server 41 executes the necessary time calculation process with using the necessary time calculation processor 53. In the necessary time calculation process, the server 41 reflects the traffic jam information in the collected traffic information on the routes, which connects between the guide object branch point Px and the process object region, as shown in FIGS. 3A and 4A. Specifically, for example, in FIG. 3A, when the process object region is a region Da, the server 41 reflects the traffic jam information in each of multiple routes R[i-d-a], R[i-f-c], R[k-h-c], which connects to the process object region Da. Further, for example, in FIG. 4A, when the process object region is a region Dc, the server 41 reflects the traffic jam information in each of multiple routes R[i-d-b], R[i-g-e], R[l-j-e], which connects to the process object region Dc.

Here, in FIGS. 3A and 4A, when the heavy traffic jam occurs at a section in the route, the server 41 blacks out the section. The heavy traffic jam provides that the vehicle completely stops traveling. When the traffic jam is not so heavy in the section, or when the traffic jam is being created in the section so that the vehicle travels with a low speed, the server 41 hatches the section. After the traffic jam information is reflected on the routes, the server 41 calculates the necessary time for reaching the process object region from the guide object branch point Px in each route. For example, in FIG. 3A, the server 41 calculates the necessary time for traveling from the guide object branch point Px to the process object region Da along with each route. In FIG. 4A, the server 41 calculates the necessary time for traveling from the guide object branch point Px to the process object region Dc along with each route.

Then, in step C5, the server 41 calculates a difference between the longest necessary time and the shortest necessary time among the necessary time of multiple routes. Further, the server 41 determines in step C6 whether the calculated difference is equal to or smaller than predetermined time. When the server 41 determines that the calculated difference is larger than the predetermined time, i.e., when the determination in step C6 is "NO," it goes to step C7. In step C7, the server 41 executes the data generation process for generating the recommended route drawing data with using the data generation processor 54. In the data generation process for generating the recommended route drawing data, the server 41 specifies the route R[i-f-c] in FIG. 3A as a recommended route, which is drawn as a broken line and has the shortest necessary time calculated by the necessary time calculation processor 53, or the route R[l-j-e] in FIG. 4A as a recommended route, which is drawn as a broken line and has the shortest necessary time calculated by the necessary time calculation processor 53. Further, the server 41 generates the recommended route drawing data for drawing and overlapping the recommended route on the region information map.

Then, the server 41 executes the guide button display data generation process with using the data generation processor 55 in step C8. In the guide button display data generation process, the server 41 generates the guide button display data for displaying the guide button, which provides execution of drawing the recommended route in the navigation apparatus 11. Further, in the guide button display data generation process, the server 41 generates the guide button display position data for specifying the display position of the guide button on the region information map. In this case, the server 41 sets the display position of the guide button near the corresponding region.

The guide button display position data is coordinate data that provides the coordinates of the display position of the guide button on the display 17 of the apparatus 11. The apparatus 11 provides the guide button based on the guide button display data received from the server 41, and displays the guide button on the screen of the display 17 at the coordinate position, which is specified by the guide button display position data received from the server 41. When the user touches and operates the guide button B at the display coordinates of the screen of the display 17, the apparatus 11 recognizes that the user operates the guide button.

The server 41 determines in step C9 whether the guide button setting process for all regions in the region information map is completed. When the server 41 determines that the guide button setting process for all regions in the region information map is not completed, i.e., when the determination in step C9 is "NO," it goes to step C2 so that the steps C2-C8 are executed. Thus, the server 41 executes the steps C2-C8 with respect to each region so that all regions specified in step C1 are set as the process object region sequentially. Specifically, the server 41 executes the steps C2-C8 with respect to all regions in the region information map, which is displayed according to the region information map display data. When the server 41 determines that the guide button setting process for all regions in the region information map is completed, i.e., when the determination in step C9 is "YES," or when the server 41 completes steps C2-C8 with respect to all regions in the region information map, the server 41 ends the guide button setting process. After the server 41 completes the guide button setting process, it goes to the data transmission process in FIG. 7. Specifically, to goes to step B5.

When the traffic information does not include the traffic jam information, and the server 41 transfers to the data transmission process without executing the guide button setting process, the server 41 transmits the region information map display data, which is retrieved in step B1. Further, the server 41 retrieves and transmits the display limit point data without displaying the button and the region guide end point data stored in the data storage element 44 and corresponding to the region information map display data.

When the traffic information includes the traffic jam information, and the server 41 transfers to the data transmission process with executing the guide button setting process, the server 41 transmits the region information map display data retrieved in step B1 in the data transmission process. Further, the server 41 retrieves and transmits the display limit point data with displaying the button and the region guide end point data stored in the data storage element 44 and corresponding to the region information map display data. Further, the server 41 transmits the recommended route drawing data, the guide button display data, and the guide button display position data, which are generated in the guide button setting process in step B4. Furthermore, the server 41 generates and transmits the necessary time data that shows the necessary time when the vehicle travels on the recommended route.

When the apparatus 11 receives data from the server 41, i.e., when the determination in step A4 is "YES," the apparatus 11 determines in step A5 whether the vehicle passes through the display limit point, which is specified based on the display limit point data received from the server 41. Specifically, in step A5, the apparatus 11 determines whether the current position of the vehicle is disposed on a branch point side from the display limit point. When the apparatus 11 determines that the current position of the vehicle travels beyond the display limit point on the branch point side, i.e., when the determination in step A5 is "YES," the apparatus 11 ends the process in FIG. 7 without displaying the region information map. In this case, the apparatus 11 may delete or cancel various data received from the server 41.

When the apparatus 11 determines that the vehicle does not travel beyond the display limit point on the branch point side, i.e., when the determination in step A5 is "NO," it goes to step A6. In step A6, the apparatus 11 determines whether the information displayed on the display 17 at the present moment has the priority higher than the region information map. Here, the information having the priority higher than the region information map is, for example, an enlarged screen image of the branch point and peripheral area of the branch point, the screen image displayed according to the operation of the user, and the screen image required by the user.

When the information having the priority higher than the region information map is displayed in the display 17, i.e., when the determination in step A6 is "YES," the apparatus 11 ends the process in FIG. 7 without displaying the region information map. In this case, the apparatus 11 may cancel or delete various data received from the server 41.

When the 17 displays the information having the priority equal to or lower than the region information map, i.e., when the determination in step A6 is "NO," the apparatus 11 executes the region information map display process in step A7. Here, the region information map display process will be explained with reference to the flowchart in FIG. 9. In the region information map display process, in step D1, the apparatus 11 displays the region information map on the display 17 according to the region information map display data received from the server 41. In this case, the apparatus 11 displays the "close button" (not shown) for closing the region information map on the screen of the display 17 as a touch button. Further, when the apparatus 11 receives the guide button display data from the server 41, the apparatus 11 displays the guide button on the screen of the display 17 as a touch button according to the guide button display data.

Figure 9:
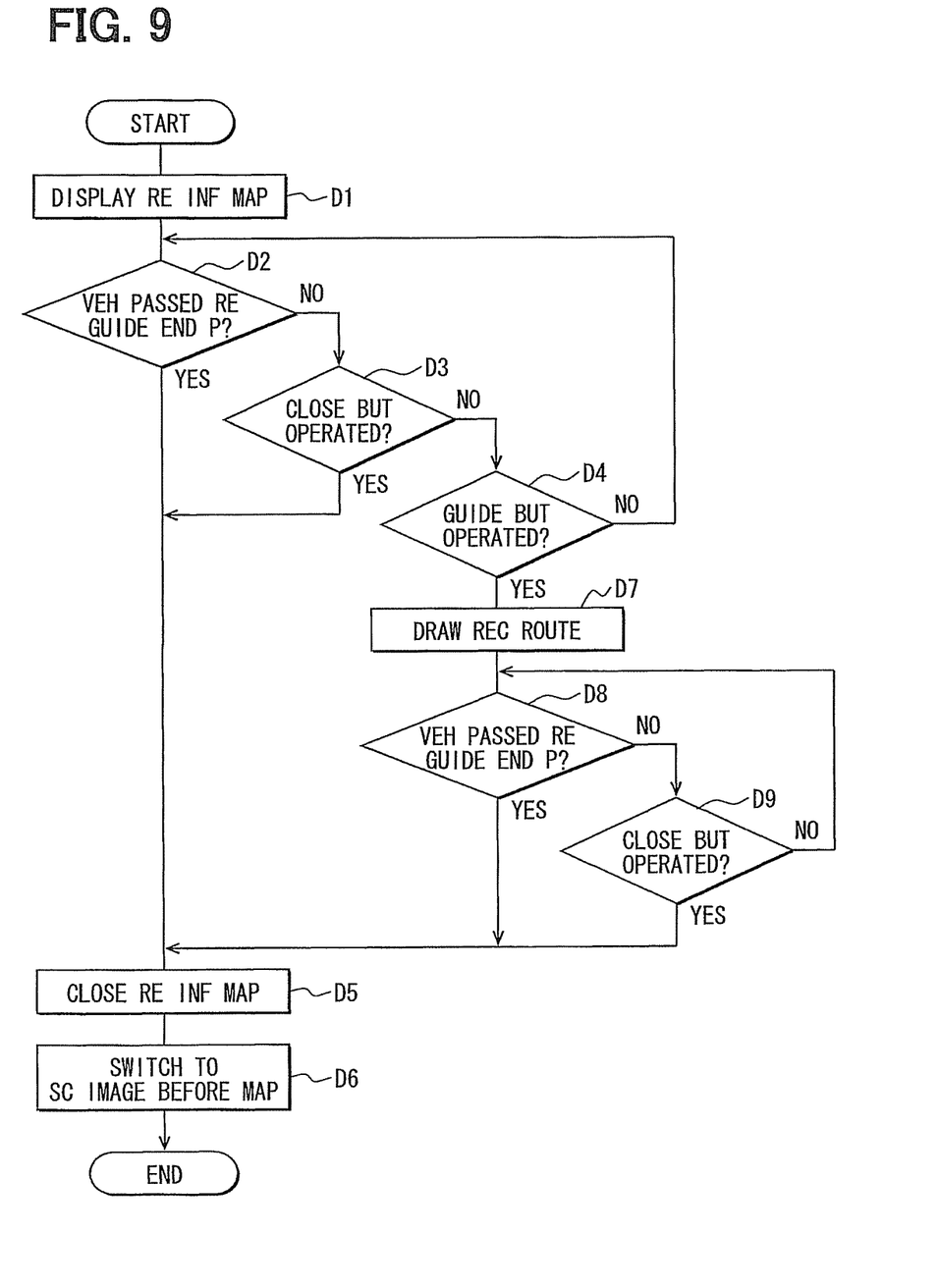
FIG. 9 is a flowchart showing a region information map display process.

When the display 17 displays the region information map, the apparatus 11 determines in step D2 whether the vehicle passes through the region guide end point, which is specified according to the region information end point data received from the server 41. Specifically, the apparatus 11 determines whether the current position of the vehicle travels beyond the region guide end point on the branch point side. Furthermore, the apparatus 11 determines in step D3 whether the close button for closing the region information map is operated. Further, when the guide button together with the region information map is displayed, the apparatus 11 determines in step D4 whether the guide button is operated.

The apparatus 11 controls the display 17 to close the region information map in step D5 when the vehicle passes through the region guide end point, i.e., when the determination in step D2 is "YES," or when the close button is operated, i.e., when the determination in step D3 is "YES." Further, it goes to step D6. In step D6, the display 17 switched to a screen image before the region information map is displayed. Then, the apparatus 11 ends the process in FIG. 9.

It goes to step D7 when the guide button together with the region information map is displayed, and the guide button is operation, i.e., when the determination in step D4 is "YES." In step D7, the apparatus 11 displays the recommended route to over lap in the region information map-on the display 17 according to the recommended route drawing data received from the server 41. In this case, when the apparatus receives the necessary time data from the server 41, the apparatus 11 displays the necessary time for driving the recommended route according to the necessary time data. When the vehicle passes through the region guide end point, i.e., when the determination in step D8 is "YES," or when the close button is operated, i.e., when the determination in step D9 is "YES," the apparatus 11 controls the display 17 to close the region information map in step D5. Further, in step D6, the apparatus 11 controls the display 17 to switch to the screen image before the region information map is displayed. Thus, the apparatus ends the process in FIG. 9.

In the present embodiment, the region information map is displayed when the vehicle travels before the branch point, which is disposed ahead of the road in the driving direction of the vehicle. When there are multiple routes connecting to a certain region, and the necessary time for driving along each route is different so that the user may hesitate to determine one of the routes, the operation button for displaying the recommended route is displayed. Accordingly, when the user operates the operation button, the user can recognize the recommended route. Thus, the user does not hesitate to select one of the routes.

Further, even when there are multiple routes connecting to a certain region, and the necessary time for driving each route is different from each other, in a case where the difference of the necessary time among multiple routes is very small, the apparatus 11 specifies the route having the shortest necessary time as the recommended route. In this case, it is difficult to differentiate the recommended route from other routes. Accordingly, the server 41 does not specify the recommended route when the difference of the necessary time among multiple routes is equal to or smaller than a predetermine time. In this case, the server 41 does not generate the recommended route drawing data.

In a case where the vehicle approaches the branch point, it is difficult for the user to secure sufficient time for confirming the region information map even when the display 17 displays the region information map. Accordingly, the apparatus 11 does not display the region information map when the vehicle passes the display limit point.

The constitution of the data storage element 44 may be different from the above embodiment. For example, the data storage element 44 stores the branch point code in relation to each branch point. Further, each branch point code may be grouped according to a city code. Here, the branch point code is a unique code of each branch point so that the branch point is identified. The city code is a unique code of each city so that the city is identified. In this case, the apparatus 11 may add the city code and the branch point code to the request signal instead of the current position data for showing the current position of the vehicle. Here, the city code shows the city, which includes the current position of the vehicle, and the branch point code shows the branch point, to which the vehicle travels. Thus, the apparatus 11 can indicate the region information map display data with using the city code and the branch point code instead of the current position of the vehicle.

In the above embodiment, the drawing execution element is the guide button. Alternatively, the drawing execution element may be a touch button, which represents the name of each region. In this case, a part of the screen image, which provides the name of the region, may be surrounded with a red frame. Alternatively, the part of the screen image may blink. Thus, the user can easily recognize the touch button.

In the determination step in step B3, the server 41 determines whether the traffic information includes the traffic jam information. Alternatively, the server 41 may determine whether the traffic information includes the traffic restriction information, construction work information, and traffic accident information.

In the above embodiment, only one recommended route is displayed. Alternatively, multiple recommended routes may be displayed. For example, in FIGS. 3A and 3B, when the user operates the guide button Ba, the display 17 displays other routes such as the route R[i-d-a] and the route R[k-h-c] in addition to the route R[i-f-c], which connect to the region Da. In this case, the display 17 may display the necessary time of each route in addition to the routes R[i-d-a], R[k-h-c], and R[i-f-c]. Further, the display color of each route R[i-d-a], R[k-h-c], and R[i-f-c] may be differentiated. For example, the route having the shortest necessary time is shown in blue color, and the route having the longest necessary time is shown in red color. Thus, the difference of the necessary time in each route is visually and indirectly shown.

The server 41 specifies the recommended route among multiple routes, each of which connects to one of regions, so that the server 41 specifies each recommended route with respect to a corresponding region among all regions, which is in the region information map displayed according to the region information map display data retrieved by the data retrieving processor 51. Alternatively, the server 41 may specify one recommended route among multiple routes connecting to a certain region, which is in the region information map displayed according to the region information map display data retrieved by the data retrieving processor 51.

The data providing device is the data providing server 41. Alternatively, the data providing device may be a roadside device such as an optical beacon. In this case, the roadside device as the data providing device supplies various data to the in-vehicle device when the vehicle passes through the roadside device. Thus, the roadside device does not supplies the data such as the region information map display data after the roadside device receives the data providing request signal from the in-vehicle device. The in-vehicle device is the navigation apparatus 11, which is mounted on the vehicle as a single body apparatus. Alternatively, the in-vehicle device may include a combination of the in-vehicle device and a mobile communication terminal, which is capable of communicating with the in-vehicle device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An information communication system comprising:
    an in-vehicle device for displaying a region information map, which includes a branch point, one or a plurality of regions disposed ahead of the branch point, and one or a plurality of routes connecting to each region; and
    a data providing device having a data storage device for storing region information map display data that provides to display the region information map,
    wherein the data providing device supplies the region information map display data to the in-vehicle device,
    wherein the data providing device further includes:
        a data retrieving device for retrieving the region information map display data from the data storage device;
        a recommended route drawing data generation device for specifying a recommended route among the plurality of routes, each of which connects to one of the regions in the region information map, and for generating recommended route drawing data that provides to display the recommended route, the region information map being to be displayed according to the region information map display data;
        a drawing execution element display data generation device for generating drawing execution element display data that provides to display a drawing execution element, which executes to draw the recommended route; and
        a data transmission device for transmitting the region information map display data, the recommended route drawing data, and the drawing execution element display data to the in-vehicle device,
    wherein the in-vehicle device includes:
        a display for displaying the region information map based on the region information map display data received from the data transmission device, and for displaying the drawing execution element based on the drawing execution element display data; and
        a recommended route drawing device for drawing the recommended route together with the region information map according to the recommended route drawing data when a user operates the drawing execution element
    wherein the data providing device further includes:
        a route number determination device for determining the number of routes, each of which connects to the one of the regions in the region information map; and
        a necessary time calculation device for calculating a necessary time of each route that is necessary for the vehicle to travel from the branch point to the one of the regions when the number of routes is equal to or larger than two,
    wherein the recommended route drawing data generation device specifies one of the routes as the recommended route;
    wherein the one of the routes has the shortest necessary time; and
    wherein the recommended route drawing data generation device does not generate the recommended route drawing data when a difference of the necessary time of each route is equal to or smaller than a predetermined time.

2. The information communication system according to claim 1,
    wherein the in-vehicle device further includes: a data request device,
    wherein the data request device requests the data providing device to supply the region information map display data when a current position of a vehicle coincides with a predetermined data obtaining point, and a driving direction of the vehicle coincides with a direction from the data obtaining point to the branch point.

3. The information communication system according to claim 2,
    wherein the data retrieving device retrieves the region information map display data from the data storage device according to a request from the data request device.

4. The information communication system according to claim 1,
    wherein the data transmission device further transmits display limit point data to the in-vehicle device,
    wherein the display limit point data shows a display limit point, which is arranged before the branch point, and wherein the display does not display the region information map when a current position of a vehicle is disposed between the display limit point and the branch point.

\* \* \* \* \*